United States Patent
Beechie et al.

(10) Patent No.: US 9,174,645 B2
(45) Date of Patent: Nov. 3, 2015

(54) SYSTEMS AND METHODS FOR DETECTING AND REDUCING HIGH DRIVELINE TORSIONAL LEVELS IN AUTOMOBILE TRANSMISSIONS

(75) Inventors: Brian E. Beechie, Armada, MI (US); Thomas F. Wentworth, Sterling Heights, MI (US); Gregory A. Sbroglia, Farmington Hills, MI (US); Bruce Geist, Sterling Heights, MI (US); Mark C. Azzaretti, Shelby Township, MI (US); Marc H. Sullivan, Southfield, MI (US); In-Soo Suh, Troy, MI (US); Mark J. Duty, Goodrich, MI (US); Changwei Cao, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 2134 days.

(21) Appl. No.: 11/749,894

(22) Filed: May 17, 2007
(Under 37 CFR 1.47)

(65) Prior Publication Data
US 2008/0288146 A1 Nov. 20, 2008

(51) Int. Cl.
*B60W 10/02* (2006.01)
*B60W 30/20* (2006.01)
(Continued)

(52) U.S. Cl.
CPC ....... *B60W 30/18027* (2013.01); *B60W 10/023* (2013.01); *B60W 10/06* (2013.01); *B60W 30/20* (2013.01); *B60W 2030/206* (2013.01); *F16H 2061/145* (2013.01); *Y10T 477/755* (2015.01)

(58) Field of Classification Search
CPC ................ B60W 10/02; B60W 30/20; B60W 2030/206; B60W 2510/1015; B60W 2510/0638; B60W 2710/025; F16H 2061/145; F16H 2057/0006; F16H 2057/0012

USPC ............... 73/114.04, 660; 701/36, 66, 67, 82; 702/56
See application file for complete search history.

(56) References Cited

U.S. PATENT DOCUMENTS 4,466,311 A * 8/1984 Hiramatsu ..................... 477/169
4,468,988 A * 9/1984 Hiramatsu ..................... 477/65
(Continued)

OTHER PUBLICATIONS

Wang, P.; Davies, P.; Starkey, J.M.; Routson, R.L. "A torsional vibration measurement system." Instrumentation and Measurement Technology Conference. pp. 661-666, May 14, 1992.*
(Continued)

*Primary Examiner* — Khoi Tran
*Assistant Examiner* — Dale Moyer
(74) *Attorney, Agent, or Firm* — Ralph E. Smith

(57) ABSTRACT

The present disclosure provides systems and methods to detect and reduce any high driveline torsional levels, such as due to the cylinder deactivation in variable displacement system engines or aggressive lock-up strategies for fuel efficiency, in automobile transmissions. The present disclosure utilizes a controller in an automobile to operate a computationally thrifty method for quickly detecting noise and vibration disturbances in the transmission. This quick detection enables fuel economic calibrations that aggressively reduce the disturbances by controlling slip in a launch device of the transmission. As problem disturbances arise, they are detected before occupants notice objectionable behavior. Once detected, the disturbances are reduced, such as by increasing launch device slip, which effectively intercepts the objectionable disturbances before they are transferred through the entire drivetrain. The present disclosure can also apply to launch devices in Dual Clutch Transmissions and Electronically-controlled Manual Transmissions.

20 Claims, 5 Drawing Sheets

(51) Int. Cl.
  *B60W 10/06* (2006.01)
  *B60W 30/18* (2012.01)
  *G06F 17/14* (2006.01)
  *F16H 61/14* (2006.01)

(56) References Cited

U.S. PATENT DOCUMENTS

| | | | | |
|---|---|---|---|---|
| 4,716,790 | A * | 1/1988 | Sawada et al. | 701/65 |
| 4,757,886 | A * | 7/1988 | Brown et al. | 192/3.3 |
| 5,064,036 | A * | 11/1991 | Schneider | 192/103 F |
| 5,226,513 | A * | 7/1993 | Shibayama | 477/169 |
| 5,365,787 | A * | 11/1994 | Hernandez et al. | 73/660 |
| 5,686,669 | A * | 11/1997 | Hernandez et al. | 73/660 |
| 5,955,674 | A * | 9/1999 | McGovern et al. | 73/650 |
| 6,024,674 | A * | 2/2000 | Sato et al. | 477/175 |
| 6,102,144 | A * | 8/2000 | Lutz | 180/65.25 |
| 6,128,959 | A * | 10/2000 | McGovern et al. | 73/660 |
| 6,314,342 | B1 * | 11/2001 | Kramer et al. | 701/1 |
| 6,477,472 | B2 * | 11/2002 | Qian et al. | 702/35 |
| 6,546,814 | B1 * | 4/2003 | Choe et al. | 73/862.08 |
| 6,729,186 | B1 * | 5/2004 | Sirrine et al. | 73/660 |
| 6,778,894 | B2 * | 8/2004 | Beck et al. | 701/50 |
| 7,785,230 | B2 * | 8/2010 | Gibson et al. | 477/62 |
| 7,788,022 | B2 * | 8/2010 | Hagari | 701/111 |
| 2002/0046006 | A1 * | 4/2002 | Qian et al. | 702/183 |
| 2002/0107625 | A1 * | 8/2002 | Beck et al. | 701/50 |
| 2005/0189192 | A1 * | 9/2005 | Serebrennikov | 192/30 V |
| 2008/0058161 | A1 * | 3/2008 | Sieffert et al. | 477/176 |
| 2008/0076635 | A1 * | 3/2008 | Lee et al. | 477/180 |
| 2009/0149298 | A1 * | 6/2009 | Otanez et al. | 477/176 |
| 2009/0277247 | A1 * | 11/2009 | Hagari | 73/35.04 |

OTHER PUBLICATIONS

McGovern, Kevin M., et al. DVA—A New Tool for the Trucking Industry. No. 942324. SAE Technical Paper, 1994.*

* cited by examiner

SYSTEMS AND METHODS FOR DETECTING AND REDUCING HIGH DRIVELINE TORSIONAL LEVELS IN AUTOMOBILE TRANSMISSIONS

FIELD OF THE DISCLOSURE

The present disclosure relates generally to transmissions in automobiles, and, more specifically, to systems and methods for detecting and reducing any high driveline torsional levels, such as due to the cylinder deactivation in variable displacement system engines or aggressive lock-up strategies in transmission launch devices for fuel efficiency, in automobile transmissions.

BACKGROUND OF THE DISCLOSURE

Variable displacement systems work by selectively turning off cylinders in an engine, such as a bank of cylinders in a V-type engine. An example of a variable displacement system is the Multi-Displacement System (MDS) available from DaimlerChrysler Corp. of Auburn Hills, Mich. For example, a variable displacement system can deactivate three or four cylinders in a V6 or V8 engine, respectively, when the torque demand of the engine is relatively low. Advantageously, such variable displacement systems improve fuel economy in modern automobiles.

Disadvantageously, disturbances can arise from any high driveline torsional vibration levels, such as due to the cylinder deactivation in variable displacement system engines or aggressive lock-up strategies to improve fuel efficiency. These disturbances can potentially cause objectionable noise, vibration, and harshness (NVH) to automobile occupants. Modern automobiles utilize conservative calibrations for controlling slip in a launch device of a transmission, such as a torque converter, to prevent NVH from disturbing occupants. However, such conservative calibrations waste fuel. Modern automobiles do not currently employ direct feedback to control the slip in the launch device. A toque converter utilizes a torque converter lock-up clutch to prevent converter slip, however there currently does not exist a direct feedback system to control the lock-up clinch. For example, there are instances when a lightly-loaded powertrain running in third or fourth gear with a locked torque converter at 1000 revolutions-per-minute (rpm) performs without objectionable NVH. However because some road conditions (e.g., a slight uphill grade) may induce disturbances, a locked-up converter during cylinder reduced operation at 1000 rpm in these gears cannot be permitted for fear of NVH.

BRIEF SUMMARY OF THE DISCLOSURE

In various exemplary embodiments, the present disclosure provides systems and methods to detect and reduce any high driveline torsional levels, such as due to the cylinder deactivation in variable displacement system engines or aggressive lock-up strategies for fuel efficiency, in automobile transmissions. The present disclosure utilizes a controller in an automobile, such as a transmission or engine controller, to operate a computationally thrifty method for quickly detecting noise and vibration disturbances in the transmission. This quick detection enables fuel economic calibrations that aggressively reduce the disturbances by controlling slip in a launch device of the transmission, such as by reducing launch device slip. As problem disturbances arise, they are detected before occupants notice objectionable behavior. Once detected, the disturbances are reduced, such as by increasing launch device slip, which effectively intercepts the objectionable disturbances before they are transferred through the entire drivetrain. The systems and methods of the present disclosure can also apply to launch devices in Dual Clutch Transmissions (DCT) and Electronically-controlled Manual Transmissions (EMAT).

In an exemplary embodiment of the present disclosure, a method to detect and reduce disturbances arising from any high driveline torsional vibration levels in an automobile transmission includes measuring one of transmission turbine speed and transmission input speed, detecting vibration arising from any high driveline torsional vibration levels based on the measured speed, and controlling slip in a launch device of a transmission responsive to detecting vibrations. The controlling slip step includes any of increasing launch device slip and returning to full cylinder operation. The method is performed in real-time by one of an engine controller and a transmission controller, and wherein the speed is measured with a transmission speed sensor signal. The detecting vibration step includes a low resolution discrete Fourier transform, wherein the low resolution discrete Fourier transform is calculated responsive to the measuring step. The detecting vibration step includes a time-domain analysis where if $|\bar{n} - n_{actual}| \geq n_{threshold}$, then disturbances are detected, wherein $\bar{n}$ is the averaged rotation speed at one of a ring gear and a transmission input speed, $n_{actual}$ is an instantaneous speed at the same location as $\bar{n}$, and $n_{threshold}$ is a tabularized threshold speed value of dynamic components developed in advance based upon response behavior of a vehicle. The detecting vibration step includes receiving a predetermined number of speeds from the measuring step, calculating a turbine speed responsive to the predetermined number of turbine speeds, wherein calculating includes one of the average value of the measured turbine speeds and the median value of the measured turbine speeds, determining a frequency value where vibration is expected, and computing a discrete-time Fourier transform at a discrete frequency value, wherein the discrete frequency is determined responsive to the frequency value. The predetermined number of speeds are spaced at a sample time interval, wherein the sample time interval gives rise to a critical frequency above which vibration frequency arising from high driveline torsional vibration levels cannot be measured. The determining step includes computing a frequency value, $f_V$, according to the formula $f_{VDS} = p \cdot (h_{ave} + s)$, where p=2 for an eight-cylinder variable displacement engine, and p=1.5 for a six-cylinder variable displacement engine, $h_{ave}$ is the calculated speed, and s is the launch device slip, and optionally, s is set to one of zero representing no slip because the launch device is locked-up and an estimate of launch device slip. The discrete frequency is determined responsive to the frequency value, $f_V$, includes computing $\delta f = 1/(\Delta \cdot N)$, where $\Delta$ is the sample time and N is the predetermined number in the predetermined number of speeds, and selecting the discrete frequency as the closest integer after dividing the frequency value by $\delta f$. The computing a discrete-time Fourier transform step includes computing a matrix W, where $W_{i,j} = w^{(i-1)(j-1)}$, i=1, ..., N/2+1, and j=1, ..., N, and wherein $w = e^{2\pi i/N}$, multiplying the $(m+1)^{th}$ row of the matrix by a vector including the predetermined number of turbine speeds, wherein m is the discrete frequency, and squaring the result of the multiplying step to provide an estimate of frequency power at the discrete frequency. Optionally, the matrix is pre-computed and stored in one of an engine controller and a transmission controller. The estimate of frequency power is compared to a threshold value to determine if disturbances are present. The transmission can include one of a Dual Clutch Transmission (DCT) and Electronically-controlled Manual Transmission (EMAT).

In another exemplary embodiment of the present disclosure, a processor-based method to detect and reduce disturbances arising from any high driveline torsional vibration levels in an automobile transmission includes measuring N speed samples, $h_0, \ldots, h_{N-1}$, wherein the speed samples include one of transmission turbine speed samples and transmission input speed samples, and wherein the samples are substantially spaced in time over $\Delta$ seconds, calculating an average speed of the N speed samples, wherein the average speed includes one of $h_{ave}$=mean $(h_0, \ldots, h_{N-1})$ and $h_{ave}$=median $(h_0, \ldots, h_{N-1})$, calculating a frequency value, $f_V$, where vibration is expected, wherein $f_V=p \cdot (h_{ave}+s)$, where p=2 for an eight-cylinder variable displacement engine, and p=1.5 for a six-cylinder variable displacement engine, and s is launch device slip, calculating a discrete frequency, m, wherein m=round $(f_{VDS}/\delta f)$, and $\delta f=1/(\Delta \cdot N)$, computing a matrix W where $W_{i,j}=w^{(i-1)(j-1)}$, i=1, ..., N/2+1, and j= 1, ..., N, and wherein $w=e^{2m/N}$, multiplying the $(m+1)^{th}$ if row of the matrix by $h_0, \ldots, h_{N-1}$, and squaring the result of the multiplying step to provide an estimate of frequency power at the discrete frequency. The processor-based method further includes checking the value from the squaring step against a threshold value, wherein if the value from the squaring step exceeds the threshold value, then disturbances are detected, and performing one of increasing launch device slip and returning to full cylinder operation responsive to detecting disturbances. One of an engine controller and a transmission controller is configured to perform the processor-based method, and wherein the measuring step is performed by a sensor. The values $\Delta$, N, and p are pre-determined, and wherein the matrix W is pre-computed. Optionally, s equals zero representing no launch, device slip.

In yet another exemplary embodiment of the present disclosure, a controller configured to detect and reduce disturbances arising from any high driveline torsional vibration levels in an automobile transmission includes memory including an operating system and a disturbance detection engine, a data store coupled to the memory through a local interface, wherein the data store includes pre-computed values used by the disturbance detection engine, input/output interfaces coupled to the data store and memory through the local interface, wherein the input/output interfaces are configured to receive one of transmission turbine and transmission input speed measurements and to transmit control information to a transmission, and a processor configured to operate the disturbance detection engine, wherein the disturbance detection engine is configured to measure one of transmission turbine speed samples and transmission input speed sample substantially spaced in time over $\Delta$ seconds, calculate a frequency value where vibration arising from any high driveline torsional vibration levels is expected, calculate a discrete frequency value as close as possible to the frequency value, perform a discrete-time Fourier transform at the discrete frequency value, compare the power at the discrete frequency value to a threshold value to determine if disturbances are present, and control a launch device in the transmission responsive to the detection of disturbances.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

Figure 1:
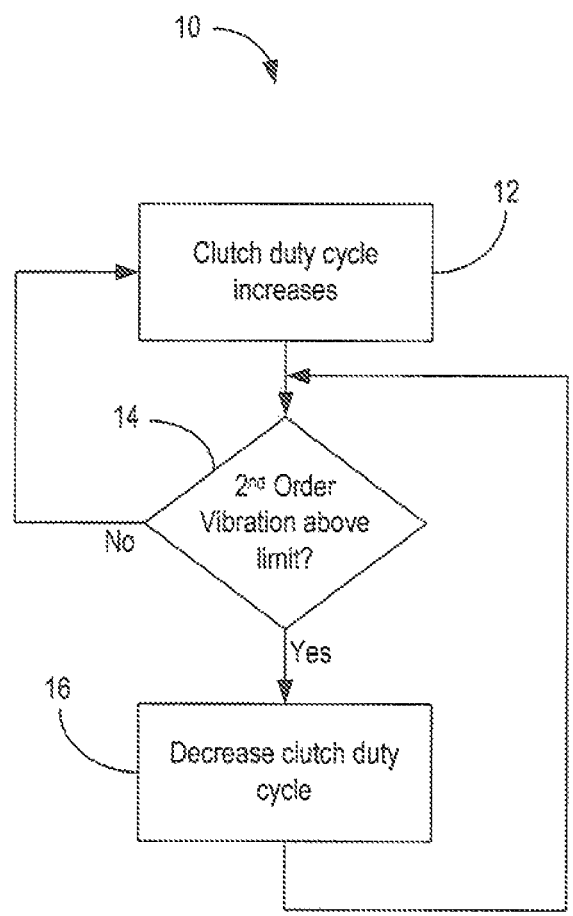
FIG. 1 is a flowchart depicting an exemplary embodiment of the present disclosure to utilize direct feedback to control a torque converter lock-up clutch duty cycle responsive to second order vibration in the transmission.

In various exemplary embodiments, the present disclosure provides systems and methods to detect and reduce any high driveline torsional levels, such as due to the cylinder deactivation in variable displacement system engines or aggressive lock-up strategies for fuel efficiency, in automobile transmissions. The present disclosure utilizes a controller in an automobile, such as a transmission or engine controller, to operate a computationally thrifty method for quickly detecting noise and vibration disturbances in the transmission. This quick detection enables fuel economic calibrations that aggressively reduce the disturbances by controlling slip in a launch device of the transmission, such as by reducing launch device slip. As problem disturbances arise, they are detected before occupants notice objectionable behavior. Once detected, the disturbances are reduced, such as by increasing launch device slip, which effectively intercepts the objectionable disturbances before they are transferred through the entire drivetrain. The systems and methods of the present disclosure can also apply to launch devices in Dual Clutch Transmissions (DCT) and Electronically-controlled Manual Transmissions (EMAT).

In an exemplary embodiment, the present disclosure utilizes an existing sensor signal configured to measure transmission turbine speed and/or transmission input speed to measure a quantity of second or one-and-a-half order vibrations being sent from the engine through a launch device, such as a torque converter, and into the transmission. Advantageously, downstream powertrain signals, such as transmission turbine speed and/or transmission input speed, are a better indicator of the frequency-based vibrations that make their way to the vehicle occupants. When this second or one-and-a-half order vibration exceeds a calibrated level, control logic will control the slip of the launch device (e.g., decrease the amount of lock-up torque converter clutch pressure) until the second or one-and-a-half order vibration is acceptable (i.e., below the calibrated level). This is because cylinder deactivation and other aggressive lock-up strategies for fuel efficiency lead to vibrations of one-and-a-half order (for six cylinder variable displacement engines) or second order (for eight cylinder variable displacement engines), detecting frequency content that exceeds calibrated thresholds in these ranges indicates disturbances.

The present disclosure relates to vibrations arising from any high driveline torsional vibration levels. Those of ordinary skill in the art will recognize that the systems and methods of the present disclosure can apply to any transmission application to provide a computationally thrifty and efficient algorithm to detect and reduce disturbances arising from any high driveline torsional vibration levels. The present disclosure is depicted for illustration purposes in regards to a torque converter and lock-up clutch in an automatic transmission. Dual Clutch Transmissions (DCT) and Electronically-controlled Manual Transmissions (EMAT) are also contemplated by the present disclosure.

Referring to FIG. 1, a flowchart 10 depicts an exemplary embodiment of the present disclosure to utilize direct feedback to control a torque converter lock-up clutch duty cycle responsive to second order vibration in an automatic transmission. As the clutch duty cycle increases (step 12), the second order vibration is checked against a limit (step 14). If the duty cycle is above the limit, then the clutch duty cycle is decreased (step 16). The flowchart 10 can limit torque converter clutch duty cycle to a threshold value of second order vibration which is just below a detectable limit. Advantageously, this enables fuel economic calibrations that aggressively reduce launch device slip.

The torque converter lock-up clutch duty cycle is monitored using an existing transmission speed sensor signal. The sensor signal is configured to provide a real-time measure of transmission turbine speed and/or transmission input speed. From this signal, a quantity of second or one-and-a-half order noise which is being sent from the engine through the transmission launch device (e.g., torque converter) and into the transmission is measured. Details of the measuring algorithm are present herein. To reduce disturbances, control logic will control the slip of the launch device (e.g., decrease the amount of lock-up torque converter pressure) if the second or one-and-a-half order noise exceeds a calibrated level until the second or one-and-a-half-order noise is acceptable (i.e., below the calibrated level).

Figure 2:
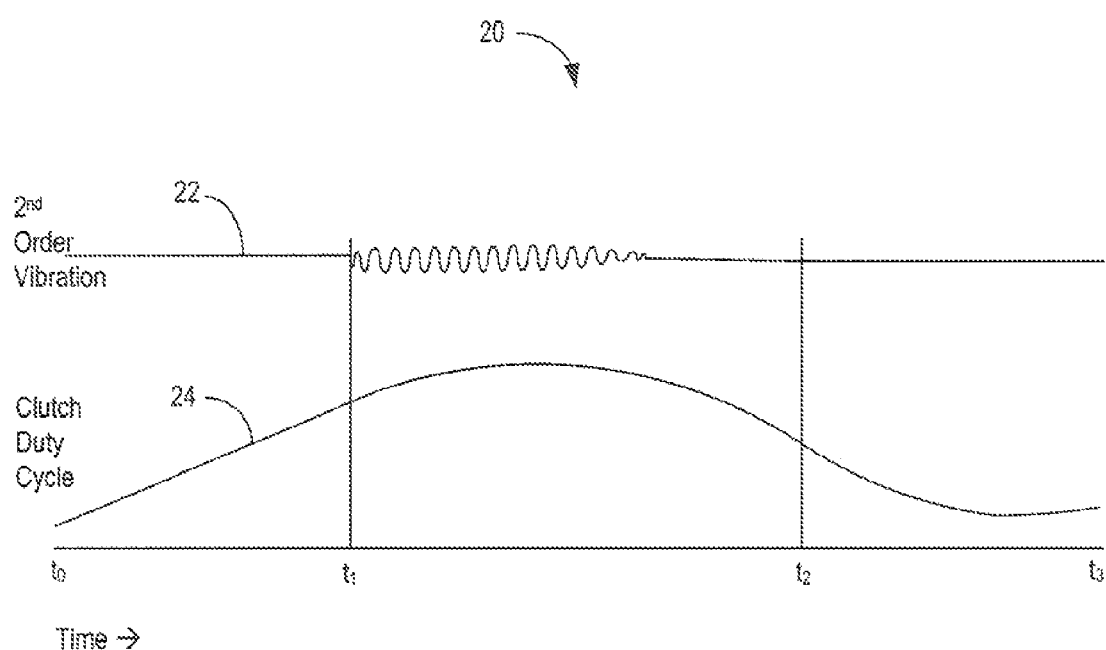
FIG. 2 is a graph depicting an exemplary embodiment of second order vibration and the corresponding clutch duty cycle over time.

Referring to FIG. 2, a graph 20 depicts an exemplary embodiment of second order vibration 22 and the corresponding clutch duty cycle 24 over time associated with cylinder deactivation in an eight-cylinder engine. Between times $t_0$ and $t_1$, there is minimal second order vibration 22 as the torque converter duty cycle 24 increases. Between times $t_1$ and $t_2$, the clutch duty cycle 24 continues to increase and accordingly second order vibration exceeds a threshold limit. Here, the systems and methods of the present disclosure monitor the second order vibration and decrease the clutch duty cycle 24 pressure once the threshold limit is exceeded. Accordingly, the second order vibration 22 is reduced between $t_2$ and $t_3$ responsive to the feedback which reduces the clutch duty cycle 24 pressure.

Figure 3:
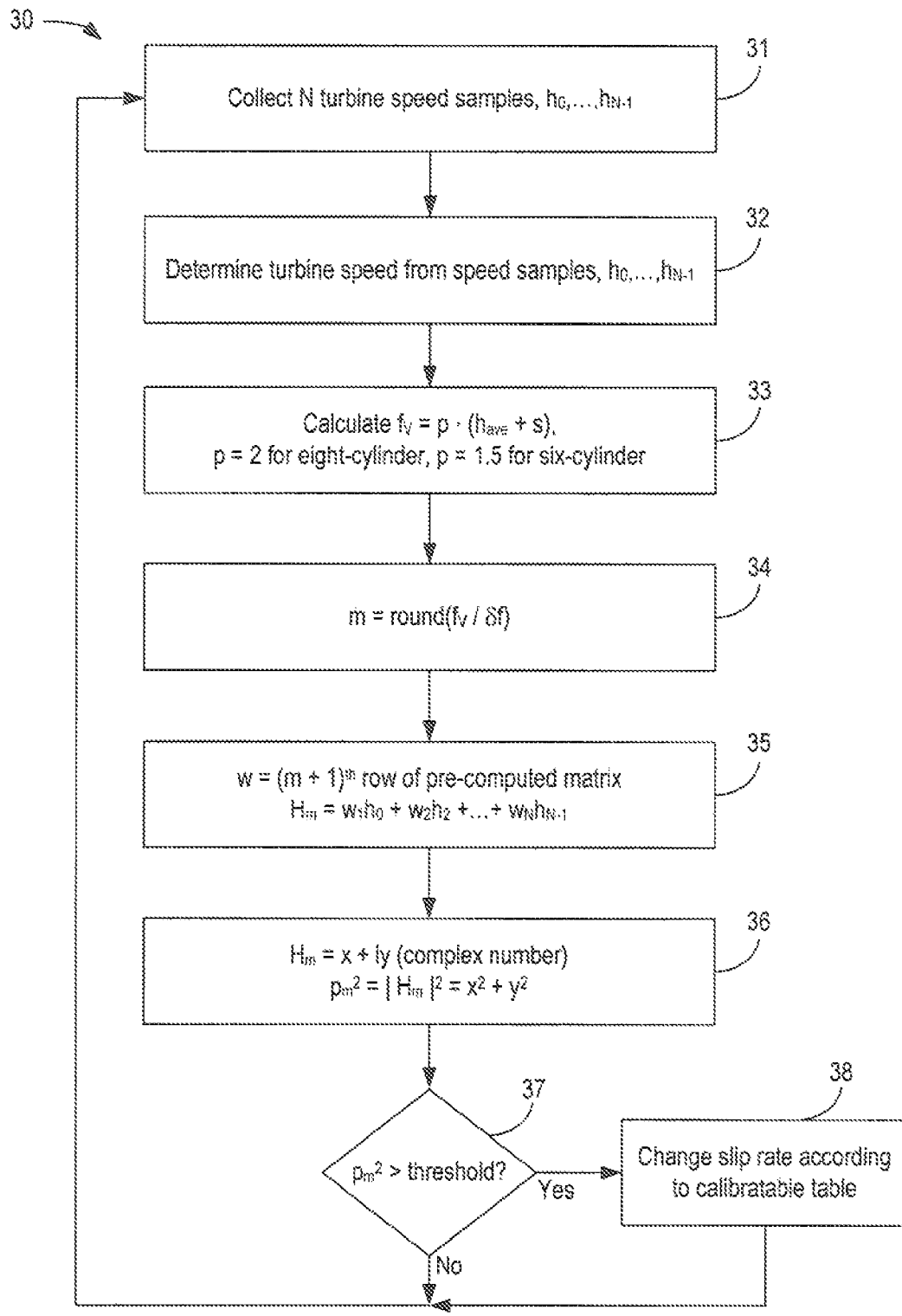
FIG. 3 is a flowchart depicting an algorithm for detecting and responding to disturbances according to an exemplary embodiment of the present disclosure.

Referring to FIG. 3, a flowchart depicts an algorithm 30 for detecting and responding to disturbances caused by any high torsional vibration levels according to an exemplary embodiment of the present disclosure. The systems and methods of the present disclosure require quick detection of disturbances to enable the feedback control to be feasible. Specifically, if vibrations arise, they must be detected before occupants notice objectionable behavior.

Disturbance detection presents a unique vehicle vibration circumstance because disturbances occur as a result of a dominant, high-amplitude and well-isolated vibration with a predictable frequency. In one exemplary embodiment, the disturbance detection algorithm 30 utilizes a very low resolution discrete Fourier transform to detect the existence of a well separated, high amplitude vibration in real-time. An extremely low frequency resolution Fourier transform produces an excellent metric for detecting disturbances. The low resolution (e.g., frequency resolution of only ±20.8 Hz has worked well in experimental work) means disturbance assessments can occur extremely quickly (e.g., in not much more time than, is required to collect 24 turbine speed samples 0.002 seconds apart). This is so quick, that it presents the opportunity for detecting disturbances before vehicle occupants notice objectionable NVH. Furthermore, the low resolution Fourier Transform has extremely low computational overhead. This low overhead means that the computation can occur on a vehicle's control unit processor (e.g., a transmission or engine controller). A reliable means of measuring and queuing a sequential set of turbine speeds sampled at $\Delta$<0.005 second time increments, plus modest computational capabilities readily available in current vehicle control micro-processors, are all that are required to make the algorithm 30 viable. In another exemplary embodiment, a time-domain analysis could be used in place of the discrete Fourier transform in the detection algorithm 30.

Detecting vibration in real-time, in the vehicle, expands opportunities to control slip in a launch device of a transmission reducing any high driveline torsional levels, such as due to the cylinder deactivation in variable displacement system engines or aggressive lock-up strategies for fuel efficiency. Without real-time detection, slip in a launch device (e.g., converter lock-up) and variable displacement engagement must be calibrated conservatively so that there is never any chance objectionable NVH might reach vehicle occupants. For example, there are instances when a lightly loaded powertrain running in third or fourth gear with a locked torque converter at 1000 rpm performs without objectionable NVH. However because some road conditions (e.g., a slight uphill grade) may induce disturbances, without real-time disturbance detection, locked-up variable displacement at 1000 rpm in these gears cannot be permitted for fear of nasty vibrations. On the other hand, when a vehicle has real-time disturbance detection, such vehicle states can be allowed, because launch device slip can quickly be increased to absorb vibration should it be detected. Alternatively, the vehicle could return to full cylinder operation when a vibration event is detected.

Because cylinder deactivation and other aggressive lock-up strategies for fuel efficiency lead to vibrations of one-and-a-half order (for six cylinder variable displacement engines) and second order (for eight cylinder variable displacement engines), detecting frequency content that exceeds calibrated thresholds in these ranges indicates disturbances. As described herein, the algorithm 30 for computing the very low resolution discrete Fourier transform of turbine speed data can serve as a metric for detecting this vibration event.

The Fourier transform $H_n=H(f_n)$ of a time signal $h(t)$ is defined as:

$$H(f_n) \equiv \int_{-\infty}^{\infty} h(t)e^{2\pi i f_n t} dt. \quad (1)$$

The total power in any time signal $h(t)$ is the square of the two-norm of the time signal. Mathematically, this two-norm, is equivalent to the two-norm of the square of the magnitude of the Fourier transform (which is a function of frequency):

$$\text{total\_power} = \int_{-\infty}^{\infty} |h(t)|^2 dt = \int_{-\infty}^{\infty} |H(f)|^2 df. \quad (2)$$

Equation 2 is from Parseval's Theorem which states the total power is the same whether it is computed in the time or frequency domain. The mathematical relationship of equation 2 shows that the total power within a time signal can be thought of as being allocated into constituent frequency bins, or components. The algorithm 30 provides a way of estimating the power within the frequency range indicating disturbances, $|H(f)|^2$. When this quantity is high relative to the total power in the time signal, $h(t)$, disturbances are likely occurring. The $|H(f)|^2$ estimate is computed quickly within either a transmission or engine controller, and accordingly this estimate can be used to determine whether the vehicle's launch device slip should be adjusted (e.g., torque converter can remain locked-up, or whether torque converter slip should be allocated to absorb vibrations).

The frequency, $f_V$, of torsional vibration arising from any high driveline torsional vibration levels is a fixed multiple of engine speed. For example, an eight-cylinder variable displacement engine, such as the HEMI available from DaimlerChrysler Corp., has a multiple of 2, and a six-cylinder variable displacement engine has a multiple of 1.5. To predict frequency, an estimate of engine speed is converted to units of Hz, then multiplied by the multiple (e.g., 2 or 1.5) depending on the engine type.

The power of frequency, $f_V$, is measured by the power spectral density function, $|H(f_V)|^2+|H(-f_V)|^2$, which indicates how much power is in the signal due to frequency, $f_V$. If h(t) represents transmission turbine speed and/or transmission input speed, so that h(t) is real-valued, then $H(f_V)=H(-f_V)$. Therefore, the power spectral density function can be written as $2\times|H(f_V)|^2$. For convenience, the factor of 2 can be dropped since $|H(f_V)|^2$ serves to indicate when a given frequency within the time signal h(t) is strong.

Since disturbances arising from any high torsional vibration levels, such as from cylinder deactivation in variable displacement engines, occurs only when engine speed contains a lot of frequency content from second or one-and-a-half order, $|H(f_V)|^2$ is estimated when $f_V$ is two times engine speed in Hz (for eight-cylinder variable displacement engines) or one-and-a-half times engine speed in Hz (for six-cylinder variable displacement engines). When the value is low, the engine is likely running smoothly and no action is required. When $|H(f_V)|^2$ is strong, launch device slip can be increased to absorb otherwise objectionable vibration. Advantageously, the algorithm 30 is a fast and efficient method for estimating $|H(f_V)|^2$ for real-time detection of disturbances within a vehicle controller. The exact threshold for determining what is high and low variable displacement frequency content with regards to disturbances can be calibrated as a look-up table in the controller.

Each sampling interval $\Delta$ of transmission turbine speeds and/or transmission input speed is associated with a critical frequency, $f_c=1/(2\Delta)$, called the Nyquist frequency. This critical frequency represents the maximum frequency that can be reliably detected when samples are collected at time intervals $\Delta$. Frequencies above $f_c$ within a signal show up as aliased frequencies. This means if h(t) contains significant frequency content above the critical frequency, that content may falsely register as frequencies below the critical frequency. However, frequency content above the critical frequency for sampled turbine speed data in the present disclosure is negligible compared to the frequency content at or near $f_V$. Therefore, any aliasing will have little effect on the estimated magnitude for $|H(f_V)|^2$.

To estimate the Fourier transform given in Equation 1 assuming that $|H(f)|=0$ when $|f|>f_c$, suppose h(t) is sampled at N time points, $t_k=k\cdot\Delta$, where k=0, ..., N−1, then these N samples determine N values of H(f), at frequencies:

$$f_n = \frac{n}{N\Delta}, \quad n = \frac{N}{2}, \ldots, \frac{N}{2}. \qquad (3)$$

Note that $f_{N/2}=f_c$, so that the uniformly distributed $f_n$ are spread evenly between $-f_c$ and $f_c$. There are N+1 frequency points $f_n$, but it will turn out the estimate for $H(f_n)$ satisfies $H(f_n)=H(f_{N+n})$ for all n. Therefore, with this mesh, there will be N independent values of H estimated from N time samples.

Let h(t) be sampled at discrete times $t=k\cdot\Delta$, k=0, ..., N−1. To estimate $H(f_n)$, a discrete sum can be introduced to approximate the integral in equation 1:

$$H(f_n) = \int_{-\infty}^{\infty} h(t)e^{2\pi i f_n t_k} dt \approx \Delta \sum_{k=0}^{N-1} h_k e^{2\pi ikn/N}, \qquad (4)$$

$$f_n = \frac{n}{N\Delta}, \quad n = -N/2, \ldots, 0, \ldots N/2. \qquad (5)$$

The final summation in Equation 4 is commonly referred to as a discrete Fourier transform of N points $h_k$. Therefore, $H_n$ is defined as;

$$H_n = \sum_{k=0}^{N-1} h_k e^{2\pi ikn/N}. \qquad (6)$$

Observe that $H(f_n)$ approximately equals $\Delta\cdot H_n$.

Note, the estimate for $H(f_n)$ is periodic in n, since $H_{n+N}=H_n$. Therefore, n is set to vary from 0 to N−1 so that k and n vary over the same range. With this convention, n=0 corresponds to the zero frequency, positive frequencies $0<f_n<f_c$ correspond to $1\leq n\leq N/2-1$, while negative frequencies $-f_c<f_n<0$ correspond to $N/2+1\leq n\leq N-1$. The value of n=N/2 corresponds to both $f=f_c$ and $f=-f_c$.

To detect disturbances, an estimate of $|H(f_V)|$ is required. The formula in (6) defines an estimate for $|H(f_V)|$. Choose a discrete frequency as near as possible to $f_V$, say $f_m$, and observe that:

$$H(f_V) \approx \Delta \cdot H_m. \qquad (7)$$

If e is vehicle engine speed in units of Hz, and h is transmission turbine speed and/or transmission input speed in units of Hz, then h=e−s where s is launch device slip in Hz. Therefore, for an eight-cylinder variable displacement system engine;

$$f_V = 2\cdot(h+s). \qquad (8)$$

When s=0, the launch device (e.g., torque converter) is locked-up, i.e., no in the launch device. This is when the detection of disturbances is needed, therefore $f_V=2\cdot h$ for an eight-cylinder engine. For a six-cylinder variable displacement system engine, the calculation is the same except the factor of 2 is replaced by 1.5. Furthermore, if resolution of the Fourier transform is low enough (e.g., N≤32), the partial converter (denoted by s above) can be neglected (e.g., 60 rpm slip produces no more than a 2 Hz change in the estimate for $f_V$).

As described herein, the algorithm 30 is computed within a controller. Several values and arrays can be pre-computed and stored in memory in the controller to avoid re-calculation for each estimate. The sample time $\Delta$ should typically be ≤0.005 s, because a sample time higher than 0.005 s could place the critical frequency below the maximum disturbance frequency arising, from any high torsional vibration levels. For example, a typical cylinder reduced engine speed maximum is 3000 rpm, which can give rise to a disturbance frequency of 100 Hz. The frequency $f_c$ should be larger than 100 Hz, which implies $\Delta$ should be smaller than 0.005 s. In exemplary embodiments, the sample time $\Delta$ is chosen as 0.002 or 0.004 s.

Also, the number of samples N must be selected, and this should be an even number. In an exemplary embodiment, N=32 which yields sixteen frequency bins, whose boundaries are the $f_n$ discussed above. These frequency bins span the range from 0 to $f_c$. The higher N is, the more precisely the frequency estimates can be resolved. However, for purposes of detecting disturbances, the disturbance frequencies must be separated from the engine speed frequencies. Therefore, excellent resolution is not required because these frequencies are not near one another. In simulation, when $\Delta$=0.002 s and N=24 is high enough to provide reasonable separation of the frequencies for an eight cylinder variable displacement engine. On the other hand, N should not be too high because detection time cannot be faster than the time required to collect data, which is N·$\Delta$. Detection time cannot exceed the time it takes for occupants to perceive a vibration. Another reason to use as small an N as possible is that the resulting low resolution means moderate to light launch device slip can he neglected in the computation of m, as described herein.

A matrix of values W is pre-computed and stored in the controller. Suppose $w=e^{2\pi i/N}$, a complex number, then define the entries of an N/2+1 by N matrix as:

$$W_{i,j} = w^{(i-1)(j-1)}, \quad (9)$$

where i=1, N/2+1, and j=1, ..., N. Also, $\delta f$ is computed as $\delta f = f_c/(N/2) = 1/(\Delta N)$. Finally s, converter slip in Hz, is pre-computed, estimated at time $t_{N/2}$, or set equal to zero.

FIG. 3 depicts the algorithm 30 for computing a metric to detect disturbances arising from any high driveline torsional vibration levels. N turbine speed samples are collected, $h_0, \ldots, h_{N-1}$ (step 31). The turbine speed samples are collected at the sample time $\Delta$, and can use an existing sensor signal which is coupled to the controller for collecting the data. The samples are collected from any downstream sensor that already exist in a vehicle, such as transmission output speed sensor or other such speed sensing devices internal or external to the transmission that could be used to provide frequency data, input to the algorithm described herein.

A turbine speed, $h_{ave}$, is determined from the collected samples, $h_0, \ldots, h_{N-1}$ (step 32). For example, $h_{ave}$ can be the average of the turbine speed samples, $h_{ave}$=mean ($h_0, \ldots, h_{N-1}$). Alternatively, $h_{ave}$ can be set to one of the middle values of the speed samples, such as the median value, $h_{ave}$=median ($h_0, \ldots, h_{N-1}$). The frequency $f_V$ is calculated as $f_V = p \cdot (h_{ave}+s)$, where p=2 for an eight-cylinder VDS engine, or p=1.5 for a six-cylinder VDS engine (step 33). This is the same calculation as shown in equation (8) above. The value of s is pre-computed or estimated at time $t_{N/2}$, but when s=0, the launch device has no slip (e.g., torque converter is locked-up), and this is typically where disturbance detection is required.

To compute $H_m$, m is determined so that when $f_m \in \{f_n, n=0, \ldots, N/2\}$, the difference $|f_m - f_V|$ is as small as possible. This is done by calculating m as m=round ($f_V/\delta f$) (step 34). When this ratio falls exactly between two integers, round down. Next, let $\vec{w}$ be the $(m+1)^{st}$ row vector from the pre-computed matrix, W (as computed in equation (9)), where $\vec{w} = (W_{m+1,N}, \ldots, W_{m+1,N})$. Let $\vec{h} = (h_0, \ldots, h_{N-1})^T$ be a column vector of length N formed from the turbine speed samples. Then, $$H_m = \vec{w} \cdot \vec{h} = \sum_{j=1}^{N} w_j h_{j-1}. \quad \text{(step 35)}$$

$H_m$ is a complex number, x+iy, and $p_m^2 = |H_m|^2 = x^2+y^2$ (step 36). The algorithm 30 calculates $p_m^2$ as a metric representing the frequency power in $H_m$. $p_m^2$ is compared against a threshold (step 37). When $p_m^2$ is large, disturbances are present. The threshold above which $p_m^2$ indicates disturbances are present can be determined by experiment. That is, a calibrator can set the thresholds for $p_m^2 = |H_m|^2$ that cause partial or full unlock events of the launch device (e.g., torque converter) by changing slip rate according to a calibratable table (step 38). Alternatively, the vehicle can be configured to exit cylinder reduced mode when disturbances are detected.

As discussed herein, the sampling rate must be at a minimum sufficient to detect 2×3000 rpm, which is 100 Hz, Also, the time N·$\Delta$ (i.e., number of samples times the sampling rate, for example 24×0.004 s=0.096 s) is a short enough time period that vehicle occupants will not notice disturbances, should it occur, in this span of time. The algorithm 30 assumes that the signal h(t) is hand limited, meaning that it has little or no frequency content above the critical frequency. If turbine speed measurement noise introduces high frequency content, additional signal processing may be required.

Figure 4A:
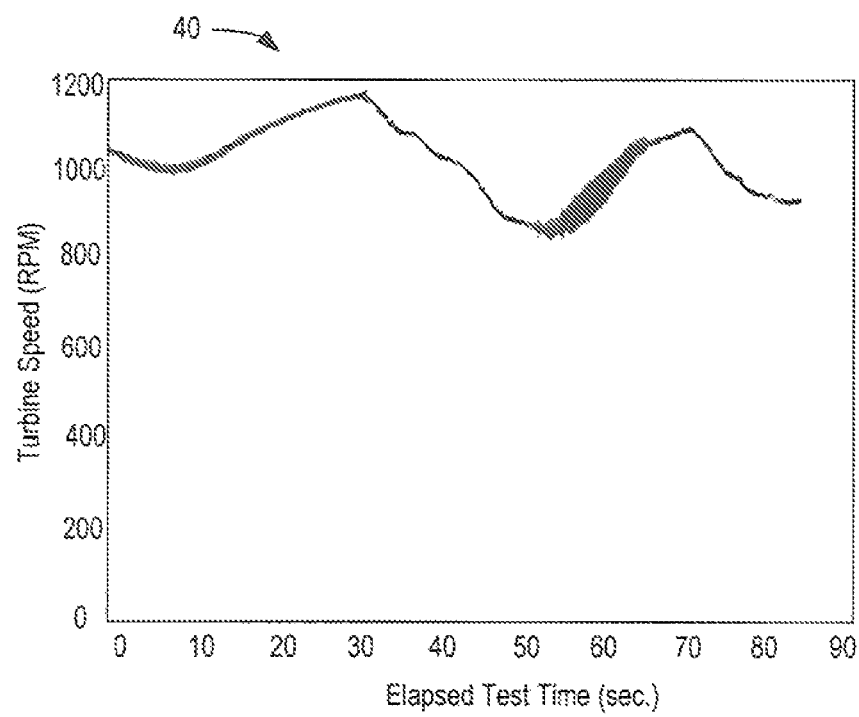
FIGS. 4a and 4b are graphs depleting actual turbine speed data and the $p_m^2$ metric calculated by algorithm of FIG. 3 on the turbine speed data.
Figure 4B:
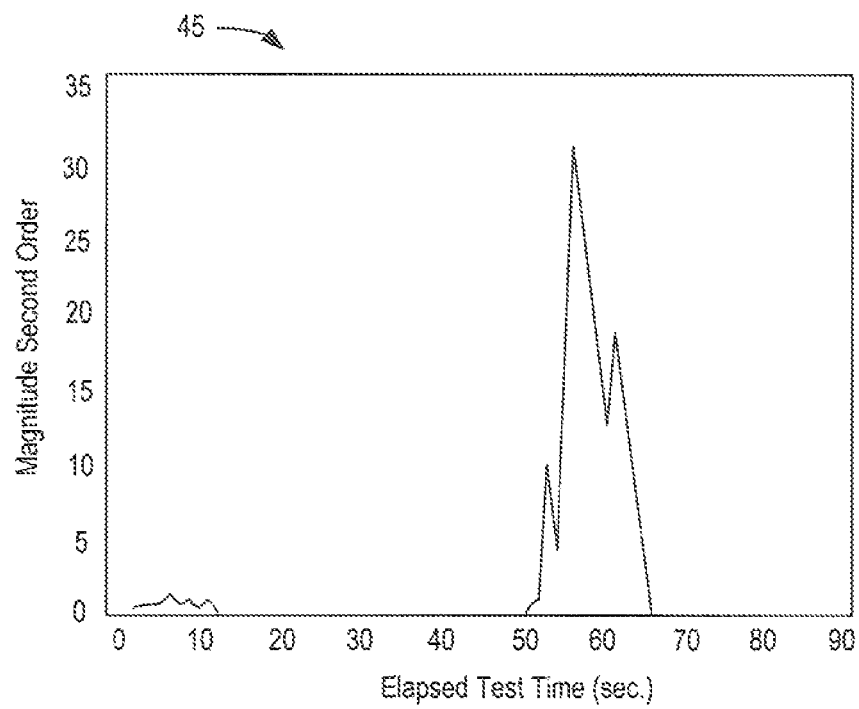

Referring to FIGS. 4a and 4b, graphs 40 and 45 depict actual turbine speed data and the $p_m^2$ metric calculated by algorithm 30 on the turbine speed data. FIG. 4a depicts collected turbine speed data showing turbine speed in rpm over time. FIG. 4b depicts the results of $p_m^2$ from algorithm 30 using parameters set to N=24, s=0, and $\Delta$=0.002 s. Disturbances occur in FIG. 4a between 51.6 s and 64.6 s. Accordingly, FIG. 4b shows that the magnitude of $p_m^2$ spikes over this interval, successfully detecting the disturbances in FIG. 4a.

Advantageously, with turbine speed measurements at time intervals of 0.005 s or less, disturbances can be detected in a fraction of a second before vehicle occupants notice objectionable behavior. This can be done based on computations carried out within on-board vehicle controller microprocessors. Using discrete Fourier transform methods, the algorithm 30 efficiently produces a metric that detects oscillations correlated with disturbances arising from high driveline torsional vibration levels, such as due to cylinder deactivation in variable displacement system engines or an aggressive lock-up strategy to prevent fuel waste.

In another exemplary embodiment, a time-domain analysis can be used in placed of the discrete-time Fourier transform. For example, in the time-domain, the expression $|\bar{n} - n_{actual}| \geq n_{threshold}$ can be used to detect disturbances in place of calculating the $p_m^2$ metric for the frequency-domain analysis. Here, $\bar{n}$ is the averaged rotation speed at a ring gear in the transmission, at a transmission input speed, or at any other speed sensing device location in the transmission, $n_{actual}$ is the instantaneous speed at the same location as $\bar{n}$, with the given sampling frequency of the engine or transmission controller unit, and $n_{threshold}$ refers to the tabularized threshold speed values of dynamic components, which is developed in advance based upon the vehicle's response behaviors, i.e., if the difference between the averaged rotation speed, $\bar{n}$, and the instantaneous speed, $n_{actual}$, is greater than the threshold speed, then disturbances are detected. Once disturbances are detected in the time-domain, the same steps can be taken to control the slip rate of the launch device as described herein.

Figure 5:
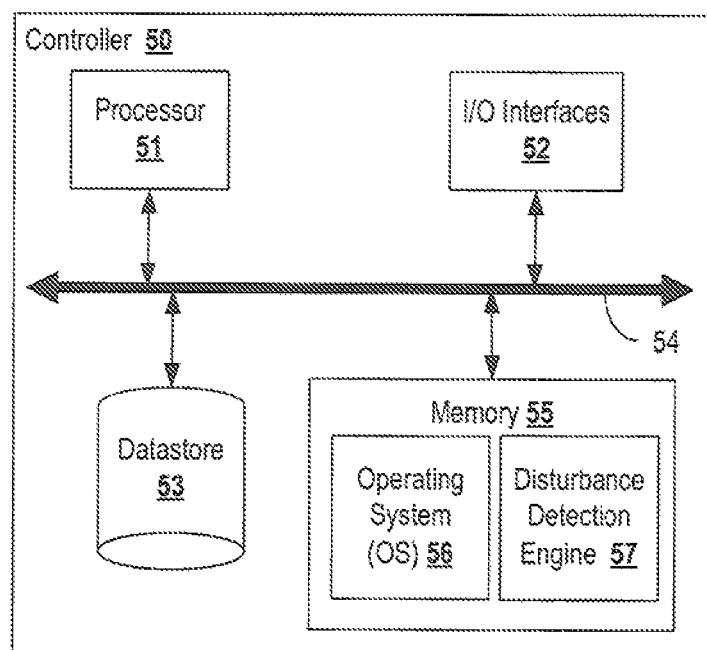
FIG. 5 is a block diagram depicting a controller configured with a disturbance detection engine according to an exemplary embodiment of the present disclosure.

Referring to FIG. 5, a block diagram depicting a controller 50 configured with a disturbance detection engine 57, according to an exemplary embodiment of the present disclosure. The controller 50 can include an existing engine or transmission controller in a vehicle. The controller 50 can be a digital computer that, in terms of hardware architecture, generally Includes a processor 51, input/output (I/O) interfaces 52, memory 55, and a data store 53. The components (51, 52, 53, and 55) are communicatively coupled via a local interface 54.

The local interface 54 can be, for example but not limited to, one or more buses or other wired or wireless connections, as is known in the art. The local interface 54 can have additional elements, which are omitted for simplicity, such as controllers, buffers (caches), drivers, repeaters, and receivers, among many others, to enable communications. Further, the local interface 54 can include address, control, and/or data connections to enable appropriate communications among the aforementioned components.

The processor 51 is a hardware device for executing software instructions. The processor 51 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 51 is configured to execute software stored within the memory 55, to communicate data to and from the memory 55, and to generally control operations of the controller 50 pursuant to the software instructions.

The I/O interfaces 52 can be used to receive input from and/or for providing system output to one or more devices or components. For example, the I/O interfaces 52 can receive a sensor input to collect transmission turbine speed samples, and provide an output to the transmission responsive to the operating the algorithm 30. The data store 53 can be used to store data, such as the pre-computed values in the algorithm 30. The data store 53 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

The memory 55 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Note that the memory 55 can have a distributed architecture, where various components are situated remotely from one another, but can be accessed by the processor 51.

The software in memory 55 can include one or more software programs, each of which includes an ordered listing of executable instructions for implementing logical functions. In the example of FIG. 5, the software in the memory system 55 includes the disturbance detection engine 57 and a suitable operating system (O/S) 56. The operating system 56 essentially controls the execution of other computer programs, such as the disturbance detection engine 57, and provides scheduling, input-output control, file and data management, memory management, and communication control and related services.

In an exemplary embodiment of the present disclosure, the disturbance detection engine 57 is configured to perform algorithm 30 as described herein. The disturbance detection engine 57 receives inputs from a sensor providing transmission turbine speed and/or transmission input speed samples, and computes the $p_m^2$ responsive to the speed samples. The disturbance detection engine 57 can also be configured to control slip rate or to command the engine to exit variable displacement responsive to defecting disturbances. In another exemplary embodiment, the disturbance detection engine 57 is configured to perform a time-domain analysis instead of a frequency-domain analysis to determine if disturbances are present.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope, of the present disclosure and are intended to be covered by the following claims.

What is claimed is:

1. A method comprising:
   collecting N turbine speed samples from a transmission;
   determining turbine speed from said N turbine speed samples;
   determining an engine speed of a vehicle engine;
   determining a target frequency indicative of a vibration disturbance in a vehicle based on said turbine speed, said engine speed of said vehicle engine, and a number of cylinders of said vehicle engine; and
   adjusting slip in a launch device of said transmission if said target frequency is detected.

2. The method of claim 1, wherein determining said engine speed includes determining a slip value.

3. The method of claim 1, wherein determining said target frequency is based on multiplying said engine speed by a constant, said constant being determined based on said number of cylinders associated with said vehicle engine.

4. The method of claim 1, further comprising determining a table index based on said target frequency.

5. The method of claim 4, further comprising referencing said table index in a reference table.

6. The method of claim 5, further comprising determining a frequency power based on said referencing and based on said N turbine speed samples.

7. The method of claim 6, further comprising comparing said frequency power to a threshold and adjusting said slip if said frequency power exceeds said threshold.

8. The method of claim 1, wherein collecting N turbine speed samples includes taking 32 or fewer turbine speed samples.

9. The method of claim 1, wherein collecting N turbine speed samples includes taking a turbine speed sample at a sample time between 0.002 to 0.005 seconds.

10. A method comprising:
    collecting N turbine speed samples from a transmission;
    determining turbine speed from said N turbine speed samples;
    determining a frequency power based on said turbine speed and based on a target frequency indicative of a vibration disturbance in a vehicle;
    comparing said frequency power to a threshold; and
    adjusting slip in a launch device of said transmission if said frequency power exceeds said threshold.

11. The method of claim 10, further comprising determining an engine speed of a vehicle engine.

12. The method of claim 11, wherein determining said engine speed includes determining a slip value.

13. The method of claim 11, further comprising multiplying said engine speed by a constant to determine said target frequency, said constant being determined based on a number of cylinders associated with said vehicle engine.

14. The method of claim 10, further comprising determining a table index based on said target frequency.

15. The method of claim 14, further comprising referencing said table index in a reference table.

16. The method of claim 15, further comprising determining said frequency power based on said referencing and based on said N turbine speed samples.

17. The method of claim 10, wherein collecting N turbine speed samples includes taking 32 or fewer turbine speed samples.

18. The method of claim 10, wherein collecting N turbine speed samples includes taking a turbine speed sample at a sample time between 0.002 and 0.005 seconds.

19. A method comprising:
- collecting N turbine speed samples from a transmission;
- determining turbine speed from said N turbine speed samples;
- determining a target frequency indicative of a vibration disturbance in a vehicle based on said turbine speed, said determining said target frequency including determining said target frequency based on a number of cylinders of a vehicle engine; and
- adjusting slip in a launch device of said transmission if said target frequency is detected.

20. A method comprising:
- collecting N turbine speed samples from a transmission;
- determining turbine speed from said N turbine speed samples;
- determining a target frequency indicative of a vibration disturbance in a vehicle based on said turbine speed and based on a number of cylinders of a vehicle engine;
- adjusting slip in a launch device of said transmission if said target frequency is detected; and
- determining a table index based on said target frequency.

* * * * *